United States Patent
Ibarz et al.

(10) Patent No.: US 9,454,714 B1
(45) Date of Patent: *Sep. 27, 2016

(54) SEQUENCE TRANSCRIPTION WITH DEEP NEURAL NETWORKS

(71) Applicant: Google Inc., Mountain View, CA (US)

(72) Inventors: Julian Ibarz, Sunnyvale, CA (US); Yaroslav Bulatov, San Francisco, CA (US); Ian Goodfellow, Montreal (CA)

(73) Assignee: Google Inc., Mountain View, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 14/587,088

(22) Filed: Dec. 31, 2014

Related U.S. Application Data

(63) Continuation of application No. 14/108,474, filed on Dec. 17, 2013, now Pat. No. 8,965,112.

(60) Provisional application No. 61/913,798, filed on Dec. 9, 2013.

(51) Int. Cl.
*G06K 9/62* (2006.01)

(52) U.S. Cl.
CPC .................. *G06K 9/6256* (2013.01)

(58) Field of Classification Search
None
See application file for complete search history.

(56) References Cited

U.S. PATENT DOCUMENTS

| | | | | |
|---|---|---|---|---|
| 5,299,269 | A * | 3/1994 | Gaborski | G06K 9/66 382/156 |
| 6,266,442 | B1 * | 7/2001 | Laumeyer | G06K 9/00818 382/104 |
| 7,953,295 | B2 | 5/2011 | Vincent et al. | |
| 8,031,940 | B2 * | 10/2011 | Vincent | G06K 9/3258 382/176 |
| 8,098,934 | B2 * | 1/2012 | Vincent | G06K 9/3258 382/177 |
| 8,503,782 | B2 | 8/2013 | Vincent et al. | |
| 2008/0002914 | A1 * | 1/2008 | Vincent | G06K 9/3258 382/299 |
| 2010/0054539 | A1 * | 3/2010 | Challa | G06K 9/3258 382/105 |
| 2014/0219563 | A1 * | 8/2014 | Rodriguez-Serrano | G06K 9/18 382/182 |

OTHER PUBLICATIONS

Cai et al., "Recursive Neural Networks Based on PSO for Image Parsing", Hindawi Publishing Corporation, Abstract and Applied Analysis, vol. 2013, 7 pages.
Farabet et al., "Learning Hierarchical Features for Scene Labeling", IEEE Transactions on Pattern Analysis and Machine Intelligence, vol. 35, No. 8, Aug. 2013, pp. 1915-1929.
Masci et al., "A Fast Learning Algorithm for Image Segmentation with Max-Pooling Convolutional Networks", Proc. of IEEE International Conference on Image Processing, Sep. 15-18, 2013, Melbourne, Australia, 5 pages.
Netzer et al., "Reading Digits in Natural Images with Unsupervised Feature Learning", NIPS Workshop on Deep Learning and Unsupervised Feature Learning, Dec. 12-17, 2011, Granada, Spain, 9 pages.

(Continued)

*Primary Examiner* — Tsung-Yin Tsai
(74) *Attorney, Agent, or Firm* — Dority & Manning, P.A.

(57) ABSTRACT

Systems and methods for sequence transcription with neural networks are provided. More particularly, a neural network can be implemented to map a plurality of training images received by the neural network into a probabilistic model of sequences comprising P(S|X) by maximizing log P(S|X) on the plurality of training images. X represents an input image and S represents an output sequence of characters for the input image. The trained neural network can process a received image containing characters associated with building numbers. The trained neural network can generate a predicted sequence of characters by processing the received image.

20 Claims, 9 Drawing Sheets

(56) References Cited

OTHER PUBLICATIONS

Pinheiro et al., "Recurrent Convolutional Neural Networks for Scene Parsing", IDIAP Research Report—22, Jun. 12, 2013—16 pages.

Seyedhosseini et al., "Multi-Scale Series Contextual Model for Image Parsing", SCI Institute Technical Report, No. UUSCI-2011-004, SCI Institute, University of Utah, 2011—15 pages.

Srivastava, "Improving Neural Networks with Dropout", A Thesis submitted to Graduate Department of Computer Science, University of Toronto, 26 pages.

* cited by examiner

SEQUENCE TRANSCRIPTION WITH DEEP NEURAL NETWORKS

PRIORITY CLAIM

This application is a continuation of U.S. patent application Ser. No. 14/108,474 filed on Dec. 17, 2013 and claims the benefit of priority of U.S. Provisional Patent Application Ser. No. 61/810,200 filed on Apr. 9, 2013, which is incorporated herein by reference for all purposes.

FIELD

The present disclosure relates generally to deep neural networks and more particularly to sequence transcription with deep convolutional neural networks.

BACKGROUND

Reading text from photographs is a difficult computer vision problem that is important for a range of real world applications. For instance, one application of interest is the problem of identifying building numbers posted on buildings or adjacent thereto. With this information, more accurate maps can be built and navigation services can be improved. Unfortunately, while highly restricted forms of character recognition are essentially solved problems (e.g., optical character recognition of printed documents, or recognition of hand-written digits), recognizing characters in natural scenes is more difficult: characters and digits in photographs are often corrupted by natural phenomena that are difficult to compensate for by hand, such as severe blur, distortion, and illumination effects on top of wide style and font variations. As a result, systems based on hand-engineered representations perform far worse reading text from photographs than a typical human.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method. The method includes training a neural network. The neural network is implemented by one or more computing devices of a system to map a plurality of training images received by the neural network into a probabilistic model of sequences comprising $P(S|X)$ by maximizing log $P(S|X)$ on the plurality of training images. X represents an input image and S represents an output sequence of characters for the input image. An image is received by the one or more computing devices. The image contains characters associated with building numbers. The trained neural network processes the received image containing characters associated with building numbers. The trained neural network generates a predicted sequence of characters by processing the received image.

Other example aspects of the present disclosure are directed to systems, apparatus, computer-readable media, devices, and user interfaces for displaying representations of geographic areas in a geographic information system.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
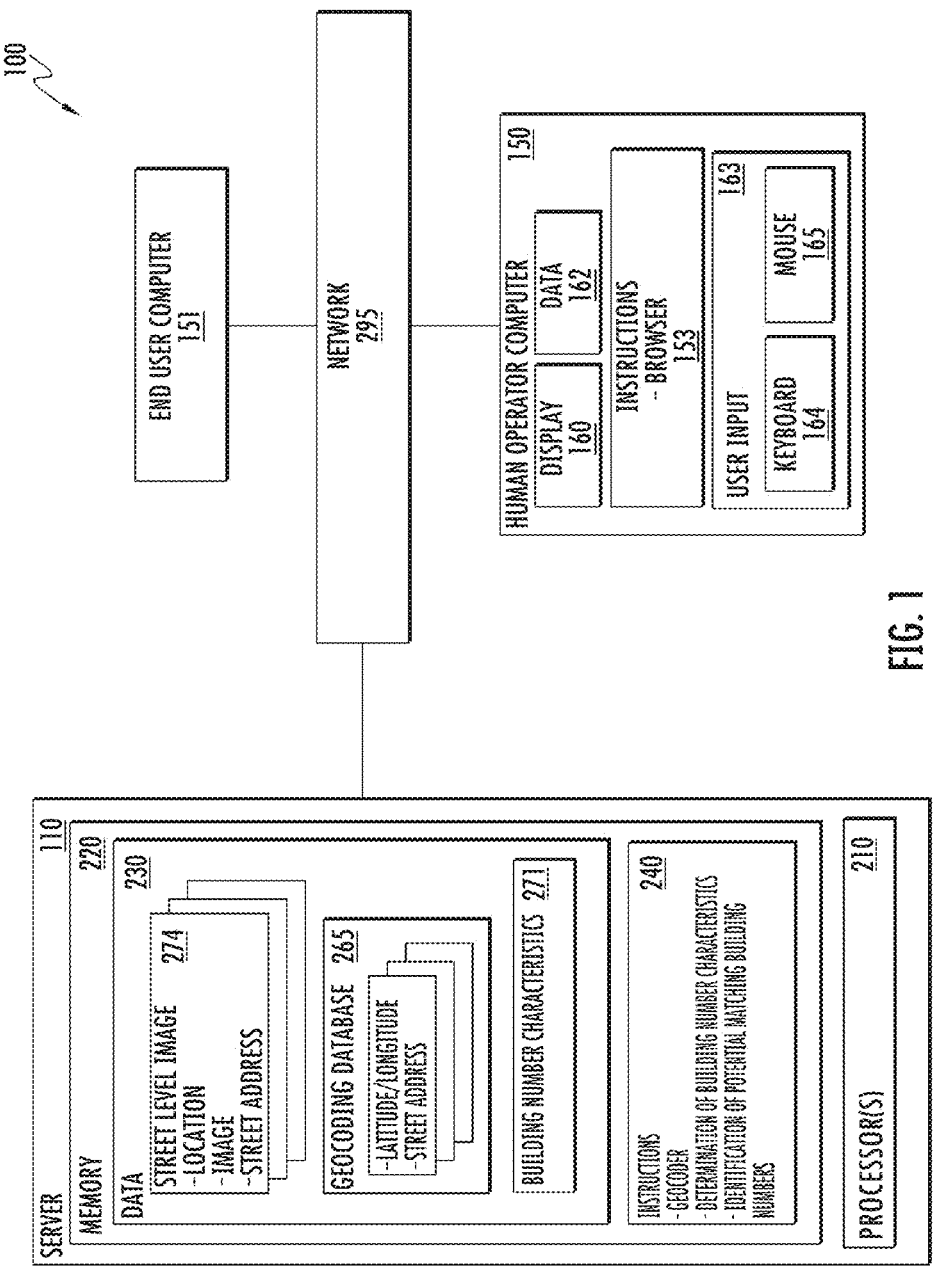
FIG. 1 illustrates an exemplary system for determining building numbers according to aspects of the disclosure.

Reference now will be made in detail to embodiments, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, example aspects of the present disclosure are directed to sequence transcription with deep neural networks. The disclosed deep convolutional neural networks can perform localization and segmentation tasks necessary for parsing sequences within images without the need for separate components such as hidden Markov models or the like. For instance, such deep convolutional neural networks can be trained by mapping images into a probabilistic model of sequences. A trained neural network in accordance with the present disclosure can generate a predicted sequence of characters from images that are processed by the trained neural network. Using the techniques described herein, a high level of accuracy for sequence transcription can be achieved.

In certain aspects of the present disclosure, deep neural networks can be utilized for transcribing building numbers from images. Building number transcription from images is a unique type of sequence recognition. Given an image, the task is to identify the building number located in the image. In this regard, building numbers may or may not correlate to a street numbering system in a given area. The building number to be identified is typically a sequence of numerical digits, s=s1, s2, ..., $s_n$. When determining the accuracy of a digit transcriber, the proportion of the input images for which the length n of the sequence and every element $s_i$ is predicted correctly can be computed. For purposes of making a map, a location should only be located on the map from its address if the building number was transcribed correctly, so accuracy of the sequence transcription is important.

The basic approach disclosed herein is to train a probabilistic model of sequences given training images. S represents an output sequence of characters for the input image and X represents an input image such that the goal is to learn a model P(S|X) by maximizing log P(S|X) on training images.

Candidates for building number sequences can be located from the training images using conventional text detection methodologies as described in more detail herein. Once candidates are identified, preprocessing utilized in connection with the present disclosure can include possible cropping of an image and/or subtraction of the mean of each image. No whitening, local contrast normalization, or the like is required by the disclosed methodologies.

In certain aspects, preprocessing can include cropping of an image near each candidate sequence. Cropping can result in candidate sequence being roughly localized, so that the input image contains only one candidate sequence. In some embodiments, the candidate sequence can be at least one third as wide as the image itself.

In some embodiments, a multi-context approach to the candidate sequences can be utilized in which an end-to-end trained deep architecture can determine if a candidate sequence is a building number. For example, a stochastic gradient descent algorithm and backpropagation techniques can be used to train the model. Such a model can receive different scales of the building number at the same time such that the context regions will all be downsized to the smallest region. The approach of this embodiment has the advantage of potentially reducing the cost of labeling as no bounding box generation is necessary.

In other aspects, character bounding boxes can be constructed around a candidate sequence. A single bounding box that contains all character bounding boxes can then be expanded in each direction, if desired. For instance, in certain aspects, the bounding box can be expanded by 30% in each direction, and the image can be cropped to that bounding box.

Images can also be rescaled as needed before processing by the neural network. As a result, the building number can be the most prominent feature of the image but there can still be variability as to the exact location of each character in the image. Also, the scale of the characters changes depending on the number of characters in the building number and the amount of space in between characters. The neural networks of the present disclosure can therefore also solve a character localization and segmentation task, not just a recognition task.

By utilizing the trained neural network described herein, building numbers can be detected and recognized in images without the need for a human operator. For example, images for a geographic area can be retrieved and processed using the described deep neural networks. Extracted sequences can be automatically assigned to images. In certain aspects of the present disclosure, confidence thresholding can permit sequence transcription to take place automatically for a number of sequences while the remaining sequences that cannot be determined to a suitable degree of confidence are identified using more expensive methods such as hiring human operators for transcription. If there is a suitable confidence that transcribed numbers are building numbers and transcribed properly, addresses can be automatically built assuming the street name and locality are known. Such embodiments permit addresses to be created directly from image data in locales where such information does not exist.

In other aspects of the present disclosure, given a street address, images of buildings can be retrieved that are likely to be proximate to the given address (such as by interpolating a latitude/longitude from the street address and querying a database of captured images tagged with the latitude/longitude of the camera's position when the image was captured). A computer can then analyze the retrieved image and search for portions of the image that are visually similar to building numbers, e.g., portions that have characteristics similar to the visual characteristics of pictures of building numbers. A computer can determine the sequence, if any, of the numeric characters appearing in those portions. By way of example, where the camera captured an image of a building with the street address "123" painted on the door, the computer can extract the integer sequence "123" from that portion of the image by using the deep neural networks of the embodiments described herein.

The extracted sequences can then be compared to the street address that was used to retrieve (or is otherwise related to) the street level image. Where any of the extracted sequences match the street address, the image of the building can be shown to a human operator and a computer can prompt the human operator to confirm that the extracted sequence appears corresponds with the address of the building. For instance, the computer can display: the image captured by the camera, a highlight around the portion of the image that contains the potential building number, and, and a question that asks the human operator whether the extracted sequence matches a building number on the building.

Figure 2:
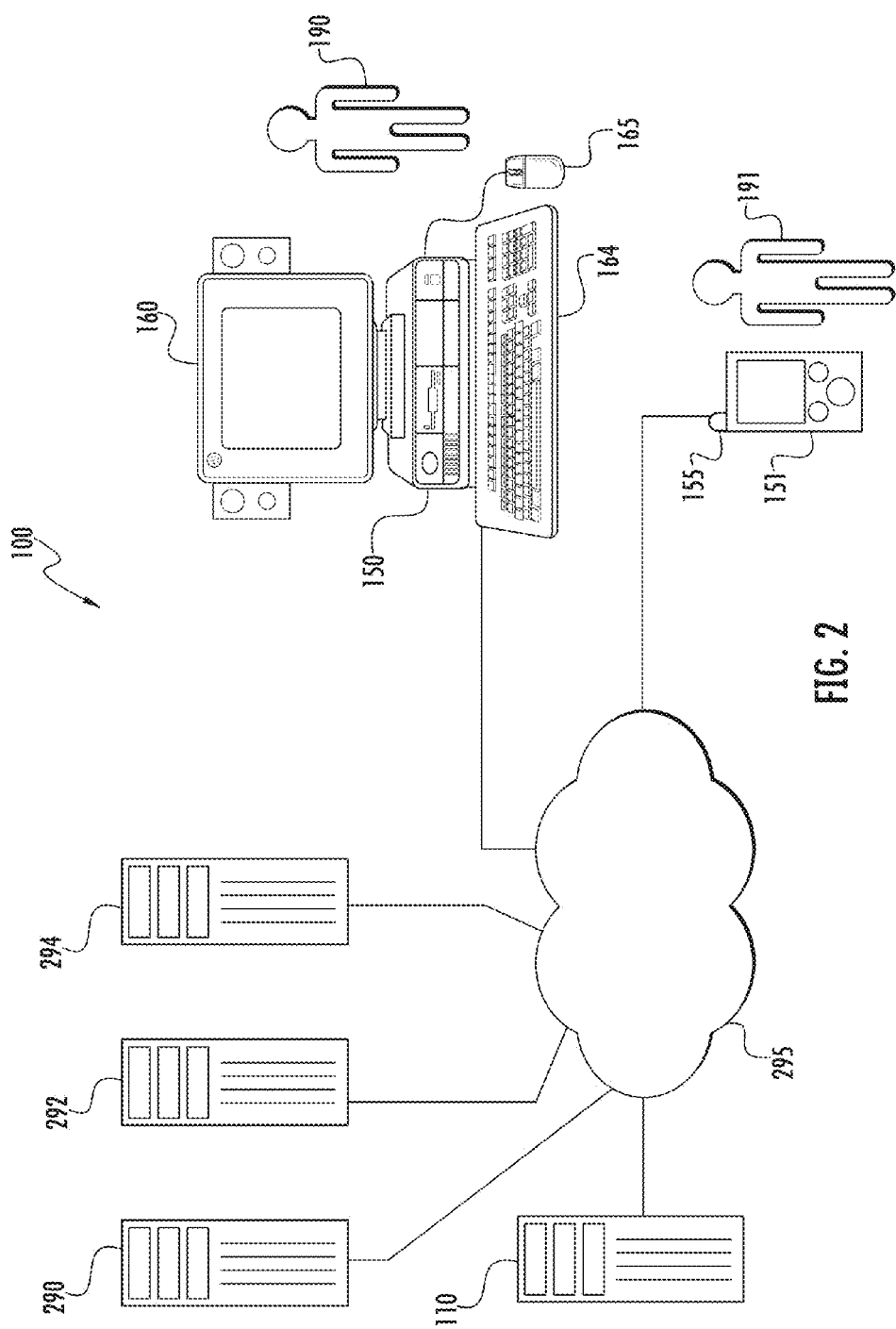
FIG. 2 illustrates an exemplary system for determining building numbers according to aspects of the disclosure.

FIGS. 1 and 2 illustrate an exemplary system 100 for determining building numbers according to aspects of the disclosure. As shown in these Figures, the system 100 can include a computer 110 containing one or more processors 210, a memory 220 and other components typically present in general purpose computers.

The memory 220 can store instructions 240 that can be executed by the one or more processor 210. The memory 220 can also include data 230 that can be retrieved, manipulated or stored by the one or more processor 210. The memory 220 can be of any type of memory capable of storing information accessible by the one or more processor 210, such as a hard-drive, memory card, ROM, RAM, DVD, CD-ROM, write-capable, and read-only memories. The one or more processor 210 can be any processor as would be known to one of ordinary skill in the art.

The instructions 240 can be any set of instructions to be executed directly (such as machine code) or indirectly (such as scripts) by the one or more processor 210. In that regard, the terms "instructions," "routines", "steps" and "programs" may be used interchangeably herein. The instructions 240 can be stored in object code format for direct processing by the one or more processor 210, or in any other computer language including scripts or collections of independent source code modules that are interpreted on demand or compiled in advance. Functions, methods and routines of the instructions 240 are explained in more detail below.

Data 230 can be retrieved, stored or modified by the one or more processor 210 in accordance with the instructions 240. For instance, although the present disclosure is not limited by any particular data structure, the data 230 can be stored in computer registers, in a relational database as a table having a plurality of different fields and records, XML documents, or flat files. The data 230 can also be formatted in any computer-readable format such as, but not limited to, binary values or Unicode.

By further way of example only, image data (not shown) can be stored as bitmaps comprised of pixels that are stored in compressed or uncompressed, or lossless or lossy formats (e.g., JPEG), vector-based formats (e.g., SVG) or computer instructions for drawing graphics. Moreover, the data 230 can comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the one or more processor 210 and the memory 220 as being within the same block, it will be understood by those of ordinary skill in the art that the processor 210 and the memory 220 can actually comprise multiple processors and memories that may or may not be stored within the same physical housing. For example, some of the instructions 240 and data 230 can be stored on removable media and others within a read-only computer chip. Some or all of the instructions 240 and data 230 can be stored in a location physically remote from, yet still accessible by, the one or more processor 210. Similarly, the processor 210 can actually comprise a collection of processors, which may or may not operate in parallel.

In one aspect, the computer 110 is a server optionally communicating with one or more client devices 150-51. For example, the computer 110 can be a web server.

Each of the client devices 150-51 can be configured similarly to the server 110, with one or more processor (not shown), memory, instructions 153, and data 162. With reference to FIG. 2, each client device 150-51 can be used by a person 190-191, respectively, such as having all of the internal components normally found in a personal computer. By way of example only, each client device can include one or more of the following: central processing unit (CPU), a display device 160, removable media, hard drive, a user input 163 (for example, a keyboard 164, mouse 165, touch-screen or microphone), speakers, modem and/or network interface device (telephone, cable or otherwise) and all of the components used for connecting these elements to one another.

Although the client devices 150-51 can comprise full-sized personal computers, the present disclosure can also be used in connection with mobile devices capable of wirelessly exchanging data. For example, client device 151 can be a wireless-enabled smartphone, or an Internet-capable cellular phone. In various aspects, the client devices and computers described herein can comprise any device capable of processing instructions and transmitting data to and from humans and other devices and computers including general purpose computers, network computers lacking local storage capability, game consoles, and set-top boxes for televisions.

Client devices 150-51 can include a component, such as circuits, to determine the geographic location of the device. For example, mobile device 151 can include a GPS receiver. By way of further example, the component can include software for determining the position of the device based on other signals received at the mobile device 151, such as signals received at a cell phone's antenna from one or more cell phone towers if the mobile device is a cell phone. In that regard, the provision of location data from a client device can occur automatically based on information received from such a component.

The server 110 and client devices 150-51 are capable of direct and indirect communication, such as over a network 295. Although only a few computers are depicted in FIGS. 1-2, it should be appreciated that the system 100 can include a large number of connected computers, with each different computer being at a different node of the network 295. For example, the system 110 can include the server 110 in communication with additional servers 290-294 (each of which can have therewith associated one or more computing devices (not pictured). The network, and intervening nodes, can comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication can be facilitated by any device capable of transmitting data to and from other computers, such as modems (e.g., dial-up, cable or fiber optic) and wireless interfaces.

The server 110 can store data representing street level images 274. Street level images 274 can comprise images of objects at geographic locations, captured by cameras at geographic locations, in a direction generally parallel to the ground.

Figure 5:
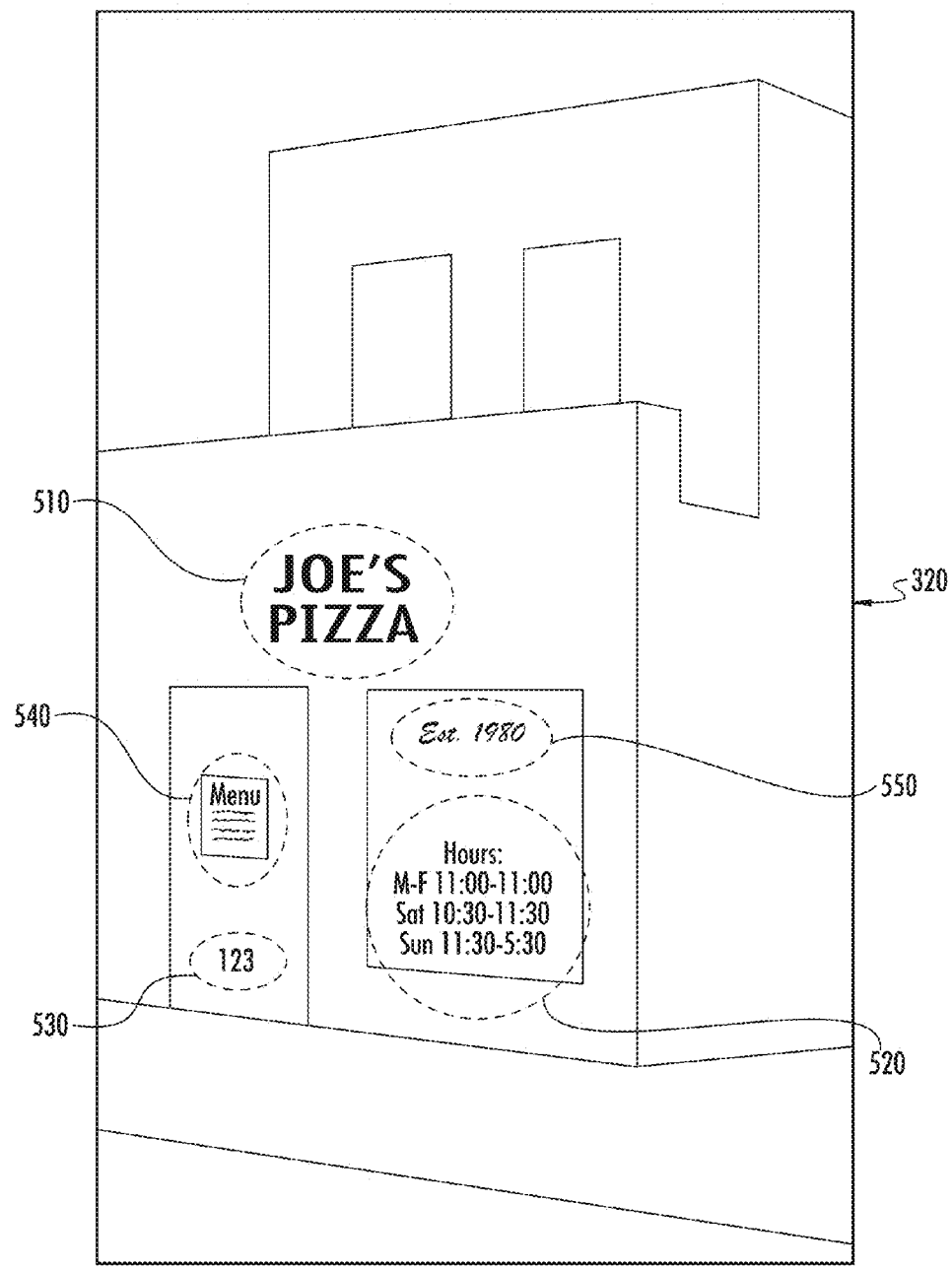
FIG. 5 illustrates an exemplary street level image according to aspects of the disclosure.

FIG. 5 illustrates an exemplary street level image 320 according to aspects of the disclosure. As shown in FIG. 5, a street level image 320 can represent various geographic objects such as a building from a perspective a few feet above the ground. It will be understood that while the street level image 320 only shows a single building for ease of explanation, a street level image can contain as many geographic objects in as much detail as the camera was able to capture.

The street level image 320 can be captured by a camera mounted on top of a vehicle at or below the legal limit for vehicle heights (e.g., 7-14 feet) from a camera angle pointing roughly parallel to the ground. Street level images 274 are not limited to any particular height above the ground, for example, a street level image can be taken from the top of a building, at or around the building facades, or even inside of buildings in certain circumstances. The images 274 can also have been taken at angles that are not strictly parallel to the ground, e.g., the camera lens can be rotated more than 30 degrees from the ground plane. Panoramic street-level images can be created by stitching together a plurality of photographs taken from different camera angles and/or from different poses.

Yet further, rather than being captured by a vehicle equipped for such a purpose, many images registered in a three-dimensional ("3D") space can be used.

Each street level image can be represented as a set of pixels associated with color and brightness values. For example, if the images are stored in JPEG format, the image can be displayed as a set of pixels in rows and columns, with each pixel being associated with a value that defines the color and brightness of the image at the pixel's location.

Street level image data 274 can further associate each street level image with a location, such as the latitude/longitude position of the camera when the image was captured.

In addition to being associated with geographic locations, street level images 274 can be associated with information indicating the orientation of the image. For example, if the street level images comprises 360° panoramic images, the orientation can indicate the portion of the image corresponding with due north from the camera position at an angle directly parallel to the ground.

Street level images can also be stored in the form of videos, such as MPEG or other suitable videos captured by a video camera or displaying, in succession, time-sequenced photographs that were captured by a digital still camera.

Moreover, some street level images can be associated with a depth map that defines the latitude/longitude/altitude position of each object at each pixel in the street level image. These depth maps can be obtained in a variety of ways, including mounting laser sensors on a vehicle to capture the latitude/longitude/altitude of object surfaces facing the camera, or image processing with stereo and structure-from-motion methods.

As shown in FIG. 1, instructions 240 can also include a geocoding routine that relies on data contained in geocoding database 265 to convert geographic locations from one reference system to another. Although the present disclosure is not limited to any particular set of reference systems, it can be particularly advantageous when used to address discrepancies between street addresses and references to a point on the Earth such as latitude/longitude positions. Accordingly, for ease of understanding and not by limitation, it will be assumed that all locations of system 100 can be expressed as either street addresses or latitude/longitude positions.

Data 230 can also store listing information identifying local businesses or other objects or features associated with particular geographic locations. For example, each listing can be associated with a name, a category (such as "pizza", "Italian restaurant" or "ballpark"), other information (such as food on a menu) and a location. The location can be expressed with respect to a street address, a latitude/longitude position, or both. The database can be compiled by automatically gathering business information (such as from websites or telephone directories), or other sources of information.

Various operations in accordance with a variety of aspects of the disclosed embodiments will now be described. It should be understood that the following operations do not have to be performed in the precise order described below. Rather, various steps can be handled in reverse order or simultaneously.

Figure 4:
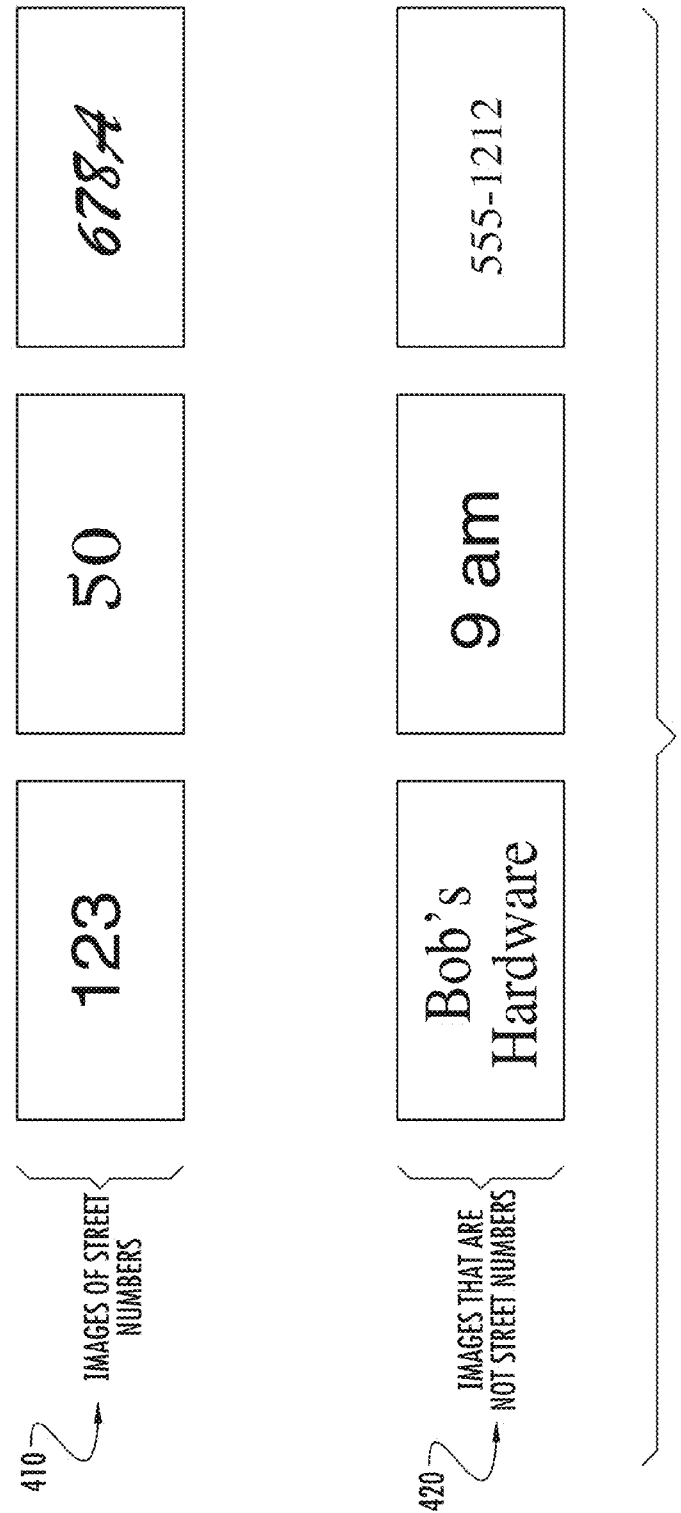
FIG. 4 illustrates exemplary images that may be used to determine the characteristics of building numbers according to aspects of the disclosure.

The trained neural network of embodiments described herein can be utilized to process images and identify building numbers. Candidates for building number sequences can be located using conventional text detection methodologies. For instance, visual characteristics that are shared by many different building numbers can be automatically identified. By way of example, the instructions can include a routine that accepts images known to share one or more visual characteristics. In that regard and as shown in FIG. 4, a first set of images 410 can be passed to the routine. These images can comprise digitized photographs of actual building numbers found on various buildings or human-created images of building numbers. By the use of heuristic and other methods, the one or more processor analyzes these images and determines the characteristics that are common to all or a substantial portion of the images. In that regard, the routine's instructions can consider haar wavelets (e.g., arranged blocks of light and dark), oriented edge gradients, and statistics of where edges occur (e.g., integral image over edge gradients). Indeed, the embodiments of the present disclosure can try different matching methods until a method (or combination of methods) and parameter values that consistently identify characteristics that are common to images 410 are located.

In one aspect, these characteristics are based on the visual appearance of the image (e.g., a picture of the number "123") rather than an image-neutral representation of the image (e.g., not the three UNICODE values representing the text string "123").

In addition, a second set of images 420 that are known to not represent building numbers can be used to increase the accuracy of the detection of the characteristics common to building numbers. By way of example, this second set of image can comprise text that is commonly found on a building but is not a building number, such as names of businesses, hours of operation and phone numbers. The embodiments of the present disclosure can be configured such that the use of an increased number of images 410 and 420 results in increased accuracy with respect to determining common characteristics.

Such images can be selected from a variety of sources, such as building number samples selected by a human operator from street level images 274.

The characteristics 271 that are common to building numbers can be stored for later access by a computer. For example, the characteristics can comprise image patterns that are common to some or all of the images in set 410. The characteristics can include candidate building number sequences. The characteristics can also comprise image patterns that are unlikely to be in a building number, such as a pattern representing the visual appearance of "9:00" (e.g., hours of operation).

While references can be made herein to a single building number characteristic for ease of reading, it will be understood to refer as well to a collection of different characteristics.

Once candidate sequences are identified for each image to be processed, images can be cropped near each candidate sequence. As discussed previously with respect to training images, cropping can result in candidate sequence being roughly localized, so that the input image contains only one candidate sequence.

In certain aspects, a multi-context approach (such as that described in reference to training images) to the candidate sequences can be utilized in which an end-to-end trained deep architecture can identify candidate sequences that are likely building numbers. Other suitable approaches can also be utilized to identify candidate sequences that are likely building numbers in accordance with the present disclosure.

The embodiments of the present disclosure can select one or more street addresses to confirm. By way of example, the embodiments of the present disclosure can iterate through a set of street addresses whose latitude/longitude positions have not been confirmed, by a human operator or otherwise. The addresses can also be selected by interpolation of known street addresses. For instance, if the latitude/longitude position of "20 Main Street" and "40 Main Street" is known, the embodiments of the present disclosure can select all even numbers (representing one side of the street) between 20 and 40 such as "22 Main Street," "24 Main Street," etc. Yet further, listings can be used as a source of addresses.

Figure 3:
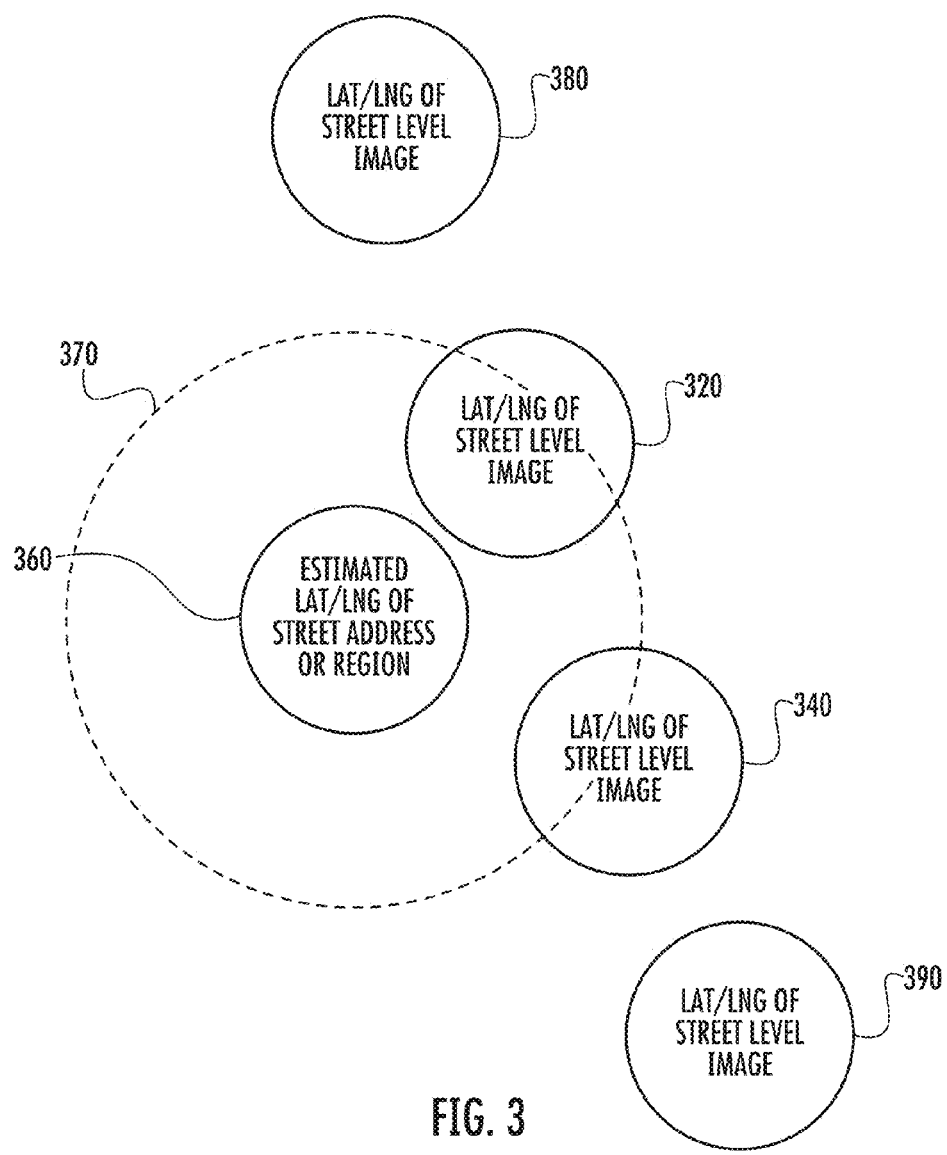
FIG. 3 illustrates a functional diagram of the latitude/longitude location of street level images and the estimated latitude/longitude of a street level address according to aspects of the disclosure.

The embodiments of the present disclosure can select a set of images that are expected to capture buildings proximate to the address of interest or region of interest. FIG. 3 illustrates a functional diagram 310 of the latitude/longitude location of street level images and the estimated latitude/longitude of a street level address according to aspects of the disclosure.

As shown in FIG. 3, the server 110 can estimate a latitude/longitude position(s) 360 of the selected address (e.g., "123 Main Street, Springfield") or region (e.g., "Mountain View, Calif."). The server 110 can then query the collection of street level images 274 for images associated with latitude/longitude positions that are within a predefined distance 370 of the estimated latitude/longitude of the street address or region. By way of example, the server 110 can select any street level image (such as image 320) having a latitude/longitude within 100 or less meters of the estimated latitude/longitude of the street address or region. Although the other street level images 340, 380 and 390 would not be selected, the range 370 can be expanded to these images, especially if a street address cannot be confirmed as described herein based on image 320. The embodiments of the present disclosure can use other criteria to select street level images, such as selecting all even or odd street level images taken along a particular street.

The selected image(s) can then be analyzed as described previously herein to determine whether any portion of the image is likely to contain a building number so that candidate building number sequences can be identified. In some aspects, the embodiments described herein utilize one or more processor to execute a routine that searches for portions of the image that match building number characteristic 271. As shown in FIG. 5, the street level image 320 can capture a building displaying the name 510 of a business, its hours of operation 520, a number on the door 530, a menu 540 and the year it was established 550.

In that regard, where the building number characteristic contains image patterns representing numeric digits, the portions of the image containing letter characters such as the name 510 and the menu 540 may not be selected. The building number characteristic can also indicate that certain image patterns that do not look like a building number but are commonly found on buildings, such as the image portion containing the hours of operation 520, the year 550, or the number on the door 530.

Once candidate locations are identified, cropping of an image near each building number can take place using a number of techniques as described herein.

Figure 6:
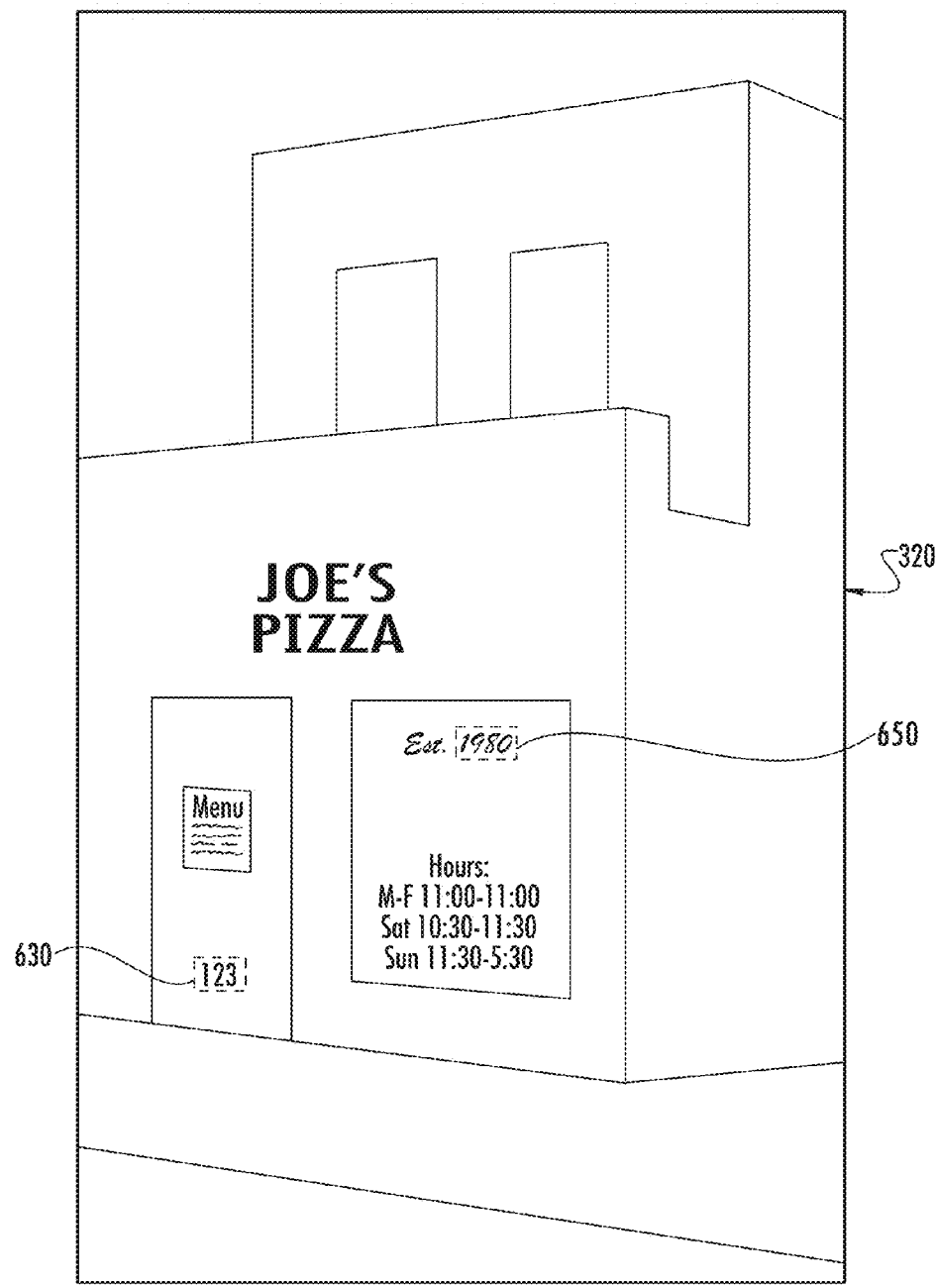
FIG. 6 illustrates another exemplary street level image according to aspects of the disclosure.

Once cropped, in certain aspects, a multi-context approach to the candidate sequences can be utilized in which an end-to-end trained deep architecture can identify candidate sequences that are likely building numbers. Alternatively, the location of a potential building number within an image can be stored by storing information identifying the bounding box of the applicable portion of the image. FIG. 6 illustrates an exemplary street level image 320 where rectangular bounds can be defined that contain potential building numbers.

As shown in FIG. 6, the top-left corner, as well as the height and width, of the portion 630 associated with the number on the door and the portion 650 associated with the establishment year can be expressed with respect to the pixels in the street level image 320. The dimensions of the bounds can be determined in accordance with a variety of methods, such as requiring all bounds to have the same dimensions. Alternatively, the routine that is used to find the portions 630/650 can return the smallest rectangle that bounds a potential building number.

After the image portions 630/650 containing potential building numbers are identified, embodiments of the present disclosure can attempt to extract image-neutral content from the image portions.

Figure 7:
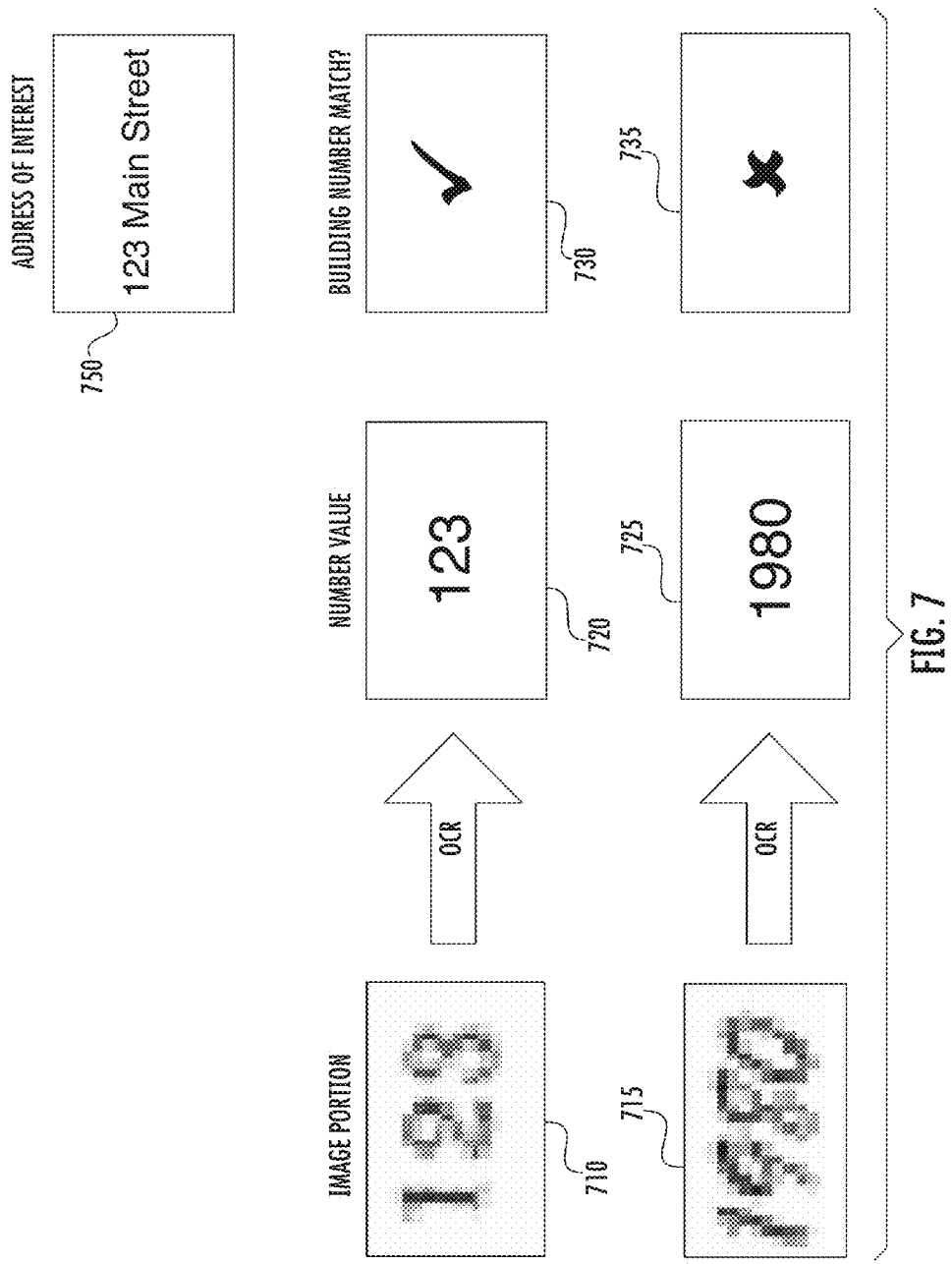
FIG. 7 illustrates logic flow that includes exemplary sample data according to aspects of the disclosure.

By way of example, the one or more processor 210 can utilize the convolutional neural networks described herein to identify one or more alphanumeric characters in image bitmaps 710 and 715 (as illustrated in FIG. 7 and which are encompassed within bounds 630 and 650, respectively). An image portion 710 can thus be associated with an integer sequence 720 (based on the characters appearing within the image portion), e.g., an integer sequence of "123". An image portion 715 can similarly be associated with an integer sequence 725, e.g., an integer value of "1980". The image portions 710/715 also can be associated with text strings.

As described previously, a special property of building number transcription is that sequences are typically of bounded length. Few building numbers contain more than five numerical digits, so models that assume the sequence length n is at most some constant N can be utilized. When making such an assumption, embodiments of the present disclosure can identify when the assumption is violated and not return a transcription so that building numbers of length greater than N are not incorrectly added to a map after being transcribed as being length N. Alternatively, certain implementations can return the most likely sequence length N, and because the probability of that transcription being correct is low, the default confidence thresholding mechanism can reject such transcription as will be described in more detail herein.

The basic approach disclosed herein is to train a probabilistic model of sequences given training images. Let S represents an output sequence of characters for the input image and X represent an input image such that the goal is to learn a model $P(S|X)$ by maximizing log $P(S|X)$ on training images.

To model S, S is defined as a collection of N random variables $S_1, \ldots, S_N$ representing the elements of the sequence and an additional random variable L representing the length of the sequence. It is assumed that the separate digits of a building number can be recognized separately so that a probability of a specific sequence $s=s_1, \ldots, s_n$ is given by $P(S=s|X)=P(L=n \text{ mid} X)\Pi_{i=1}^{n} P(S_i=s_i \text{ mid} X)$. The model can be extended to detect when the assumption is that the sequence has a length of at most N, by adding an additional value of L that represents such an outcome.

Each of the variables described herein is discrete, and when applied to a building number transcription, each has a small number of possible values. For instance, in certain aspects of the present disclosure, L has 7 values (0, . . . , 5, and "more than 5"), and each of the digit variables has 10 possible values (0, . . . , 9). In certain aspects, L is less than or equal to 20. In still other aspects, L is less than or equal to 10.

Figure 8:
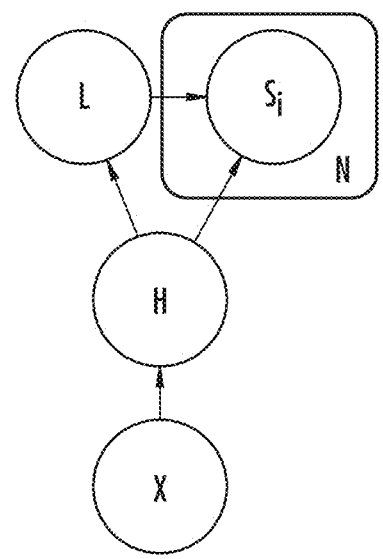
FIG. 8 illustrates an exemplary plate notation of a sequence transcription model according to aspects of the disclosure

As a result, it is feasible to represent each of the variables with a softmax classifier that is attached to intermediate features extracted from X by a convolutional neural network as described herein. These features can be represented as a random variable H whose value is deterministic given X, as modeled as $P(S|X)=P(S|H)$ on training images. A graphical model depiction of the network structure described herein is illustrated as FIG. 8. Note that the relationship between X and H is deterministic. The edges going from L to $S_i$ are optional, but help draw attention to the fact that the definition of P(S) does not query $S_i$ for i>L.

To train the model, log $P(S|X)$ is maximized on training images. In certain aspects of the present disclosure, the stochastic gradient learning rule is implemented. Each of the softmax models, (the model for L and each $S_i$) can use the same backpropagation learning rule as when training an isolated softmax layer, except that a digit classifier softmax made backpropagates nothing on examples for which that digit is not present.

When using the trained model, it is predicted that $s=\text{argmax}_s$ log $P(S|X)$. This argmax can be computed in linear time. The length of the sequence is influenced by the confidence of each of the digit predictors, but the digit predictions can be maximized independently. The argmax can thus be computed by finding the most likely digit at each position, then enumerating the probabilities of all sequence lengths, for a total runtime of O(N).

As described above, the present disclosure can be implemented using a deep neural network. One such type of a neural network is a convolutional neural network. As described, a neural network includes "layers" with each layer including nodes. Any suitable number of layers or nodes can be utilized in accordance with the present disclosure.

A layer that receives input can be referred to as an input layer and a layer that delivers output can be referred to as an output layer. Each node in a neural network can correspond to a mathematical function having adjustable parameters, and from which can be computed a scalar output of one or more inputs. All of the nodes can be the same scalar function, differing only according to possibly different parameter values, for example. By way of example, the mathematical function could take the form of a sigmoid function. It will be appreciated that other functional forms could be used as well. As shown, the output of each node of a given layer is connected to the input of every node in the next layer, except that the input layer receives its input from data presented to the neural network, and the output layer delivers output data from the neural network. Taking the example of a sigmoid function, each node could compute a sigmoidal nonlinearity of a weighted sum of its inputs.

A variety of known techniques can be used to train a neural network. These can include stochastic gradient descent, batch gradient descent, second order methods, Hessian-free optimization, and gradient boost, among possibly others.

A neural network, including its layers, nodes, and connections between nodes can be implemented as executable instructions stored in one or another form of non-transient computer readable media, and executed by one or more processors.

It will be appreciated that the convolutional neural network described herein is just one type of neural network that could be used for transcription of sequences. The neural network described herein should not be viewed as limiting the scope of example embodiments described herein.

In certain embodiments, the convolutional neural network architecture can include convolutional hidden layers. For instance, in one exemplary embodiment, eight convolutional hidden layers, one locally connected hidden layer, and two densely connected hidden layers can be utilized. Connections in such embodiment can be feedforward and from one layer to the next (no skip connections). The first hidden layer in such exemplary embodiment can contain maxout units (with three filters per unit) while the others contain rectifier units. The number of units at each spatial location in each layer can vary as would be understood in the art. The fully connected layers of this exemplary embodiment can contain 3,072 units each and each convolutional layer can include max pooling and subtractive normalization. In this exemplary embodiment, the neural network can be trained with dropout applied to all hidden layers but not the input.

Building numbers can be detected and recognized from the extracted sequences using one or more processor 210. For example, images for a geographic area can be retrieved and processed using the described deep neural networks. Extracted sequences can be automatically assigned to images. If there is a suitable confidence that transcribed numbers are building numbers and transcribed properly, addresses can be automatically built assuming the street name and locality are known. Such embodiments permit addresses to be created directly from image data in locales where such information does not exist.

In alternate embodiments, the one or more processor 210 can then compare the extracted sequences against the building number of the current address of interest. For instance, the integers "123" and "1980" can be compared with the building number in the address "123 Main Street," which is the address that was used to select street level image 320. Referring again to FIG. 7, if the extracted sequence matches the building number of the selected address, the one or more processor 210 can maintain a reference to the matching image portion 710 and discard any further reference to the non-matching portion 715.

In another aspect, the embodiments can consider the image portions 710/715 to match the selected address where the extracted sequence is substantially equal to the selected address. By way of example, any number within the integer range of "120" to "126" (e.g., 123+/−3) can be considered a match. By using a range, the system and method can select image portions containing building numbers even where the extrapolation of the address' latitude/longitude position was inaccurate. The range of tolerance can be selected using various methods, such as using: constant values (e.g., +/−3 integer values); the entire range of even or odd street addresses between street addresses that have already been confirmed (e.g., a human operator stored, at the time the street level images were captured, the building numbers of buildings at intersections) or; the expected density of building numbers within a certain physical distance (e.g., a 100 m section of a Manhattan street can include more building numbers than a 100 m of a rural road, which can counsel in favor of using a higher tolerance in Manhattan).

In still another aspect, the embodiments can perform batch processing with respect to a large collection of addresses. The foregoing building number identification and extraction can be performed once for each image and the results used to match against multiple addresses within a range. As noted above, each stage of the foregoing process can also be performed by a different set of computers.

Optionally, a human operator can be asked to confirm whether the identified image portions are likely to be building numbers. Alternatively, confidence thresholding can permit sequence transcription to take place automatically for a number of sequences while the remaining sequences that cannot be determined to a suitable degree of confidence are identified using more expensive methods such as hiring human operators for transcription. Confidence thresholding can permit sequence transcription to take place automatically for a number of sequences while the remaining sequences that cannot be determined to a suitable degree of confidence are identified using more expensive methods such as hiring human operators for transcription. For instance, in certain aspects, the predicted sequence of characters from the identified image has a probability of accuracy of greater than or equal to 95%. In certain aspects, the predicted sequence of characters from the identified image has a probability of accuracy of greater than or equal to 98%.

The results from the sequence transcription can be stored for later use. For example, the one or more processor 210 can store a link in memory 220 that associates the confirmed address (e.g., "123 Main Street") with street level image 320. Where the street level image is a panoramic image, the address can be further associated with the orientation of the image that corresponds with the building number.

Where the geographic positions of the building surfaces shown in the street level image are associated with latitude/ longitude/altitude data, such surface information can also be associated with the confirmed address. For example, each pixel of the image 320 that shows a portion of building surface can be associated with a latitude/longitude/altitude position. Thus, where an end user views the street level image and selected or panned to a particular pixel within the image, the street address of the building at that pixel can be shown with a high degree of accuracy. The building number also can be associated with the entire range of latitude/longitude positions occupied by the building.

Where the server 110 has access to listing information associated with the building's address, such as the name of the businesses at that address, the listing information can be shown to the user as well.

Many of the foregoing features can also be combined to create a score that is used by the embodiments described herein to determine whether the server 110 should request human assistance. By way of example only, the score can be determined based on values indicative of: the extent of similarity between the image portion and image patterns of building numbers; the confidence that the characters returned by the neural network match the characters displayed in the image; the confidence that the characters returned by the neural network match typical building numbers (e.g., the presence of a non-numeric character in the middle of numeric characters can result in a low confidence score); the number of digits in an extracted number; the count of images, or conflicting images, in which the number appears; and the absolute value of the difference between the expected address and the building number extracted from the portion. This final score can be compared against a threshold to determine which portions should be sent to a human operator for confirmation.

Alternatively, human confirmation can be skipped in matches with high confidence scores. In other words, a human operator can be asked to confirm building numbers where there are borderline confirmation scores. In that regard, there can be at least two thresholds: (1) a minimum threshold below which the building number may not be associated with the address based on that image portion and (2) a threshold above which the building number can be associated with the address without awaiting human confirmation. Yet further, the human operator confirmation itself can be used as a component of a total score that is used to determine whether a link between the address and the street level image should be stored.

Figure 9:
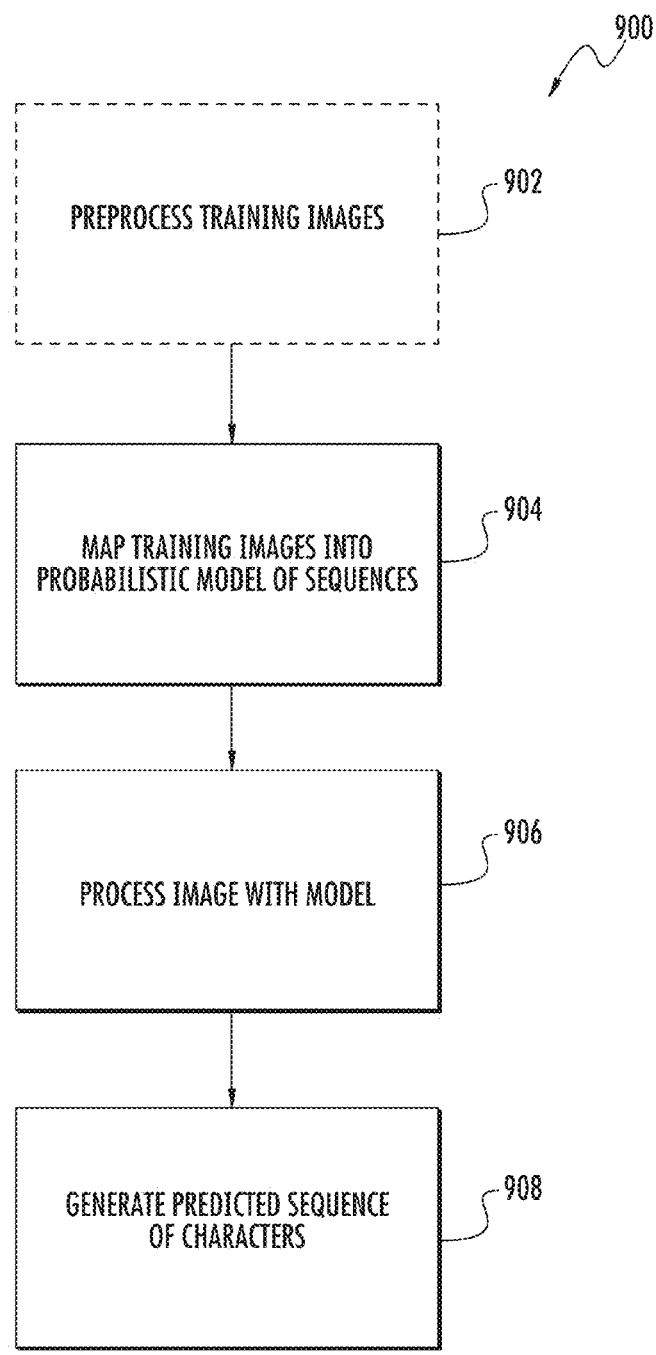
FIG. 9 illustrates a flow diagram of an example method according to aspects of the disclosure.

FIG. 9 depicts a flow diagram of an example method (900) for determining building numbers in images according to aspects of the disclosure. The method (900) can be implemented by one or more computing devices, such as one or more of the computing devices depicted in FIG. 1. In addition, FIG. 9 depicts steps performed in a particular order for purposes of illustration and discussion. One of ordinary skill in the art, using the disclosures provided herein, will appreciate that various steps of the methods discussed herein can be omitted, rearranged, combined and/or adapted in various ways.

Initially, at (902) the convolutional neural network can receive training images previously identified as images containing one or more building numbers. The training images received by the neural network can optionally be preprocessed such that each image includes candidate building numbers. In certain aspects of the present disclosure, candidate building numbers are contained within one or more bounding boxes.

At (904) the neural network can be trained by mapping the received training images into a probabilistic model of sequences.

The trained neural network at (906) can process an image containing characters associated with building numbers. The image to be processed can also be preprocessed as described herein.

At (908) the trained neural network can generate a predicted sequence of characters from processing the identified image.

In this manner, the disclosed embodiments provide a mechanism by which one or more street level images can be associated with a particular address. The system provides that a given street level image can be associated with a given address through the deep convolutional neural networks described herein and, in particular, by recognizing potential building numbers in a street level image. Moreover, by leveraging human moderation, the disclosed embodiments ensure a higher degree of accuracy.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method comprising:
receiving, by the one or more computing devices, an image containing characters associated with character sequences;
processing, by the one or more computing devices, the received image using a trained neural network, wherein the trained neural network has been trained on a plurality of training images to predict character sequences in images by maximizing log $P(S|X)$, wherein X represents an input image and S represents an output sequence of characters for the input image; and
the plurality of training images each contain a sequence of characters having a character sequence length that is greater than 1, wherein each character in the character sequence is a discrete variable having a finite number of multiple possible values; and
generating, by the one or more computing devices, with the trained neural network a predicted sequence of characters based at least in part on the processing of the received image.

2. The computer-implemented method of claim 1, wherein the neural network is configured to assume a predetermined maximum sequence length that is greater than 1.

3. The computer-implemented method of claim 1, wherein at least one of the plurality of training images is preprocessed to subtract the mean of the respective image prior to being received by the neural network.

4. The computer-implemented method of claim 1, wherein when processing the received image, the trained neural network performs localization and segmentation on the received image.

5. The computer-implemented method of claim 1, wherein S is defined as a collection of N random variables $S_1, \ldots, S_N$ representing the elements of the sequence and an additional random variable L representing the length of the sequence so that a probability of a specific sequence $s=s_1, \ldots, s_n$ is given by $P(S=s|X)=P(L=n \text{ mid} X)\Pi_{i=1}^{n}P(S_i=s_i \text{ mid} X)$.

6. The computer-implemented method of claim 4, wherein L is less than or equal to 20.

7. The computer-implemented method of claim 4, wherein a softmax function is utilized to predict each random variable.

8. The computer-implemented method of claim 1, wherein the received image is a street level image.

9. The computer-implemented method of claim 1, further comprising storing an association between the predicted sequence of characters and the received image.

10. The computer-implemented method of claim 1, wherein the neural network is end-to-end trained by back-propagation.

11. A system comprising:
one or more processors;
one or more memories; and
machine-readable instructions stored in the one or more memories, that upon execution by the one or more processors cause the system to carry out operations comprising:
receiving an image containing characters associated with character sequences;
processing the received image using a trained neural network, wherein
the trained neural network has been trained on a plurality of training images to predict character sequences in images by maximizing log P(S|X), wherein X represents an input image and S represents an output sequence of characters for the input image; and
the plurality of training images each contain a sequence of characters having a character sequence length that is greater than 1, wherein each character in the character sequence is a discrete variable having a finite number of multiple possible values; and
generating with the trained neural network a predicted sequence of characters based at least in part on the processing of the received image.

12. The system of claim 11, wherein at least one of the plurality of training images is preprocessed to subtract the mean of the respective image prior to being received by the neural network.

13. The system of claim 11, wherein when processing the received image, the trained neural network performs localization and segmentation on the received image.

14. The system of claim 11, wherein S is defined as a collection of N random variables $S_1, \ldots, S_N$ representing the elements of the sequence and an additional random variable L representing the length of the sequence so that a probability of a specific sequence $s=s_1, \ldots, s_n$ is given by $P(S=s|X)=P(L=n \text{ mid} X)\Pi_{i=1}^{n}P(S_i=s_i \text{ mid} X)$.

15. The system of claim 14, wherein L is less than or equal to 20.

16. The system of claim 14, wherein L is less than or equal to 10.

17. The system of claim 11, wherein the received image is a street level image.

18. A non-transitory computer-readable medium storing instructions that, when executed by one or more computing devices, cause the one or more computing devices to perform operations, the operations comprising:
receiving an image containing characters associated with character sequences;
processing the received image using a trained neural network, wherein
the trained neural network has been trained on a plurality of training images to predict character sequences in images by maximizing log P(S|X), wherein X represents an input image and S represents an output sequence of characters for the input image; and
the plurality of training images each contain a sequence of characters having a character sequence length that is greater than 1, wherein each character in the character sequence is a discrete variable having a finite number of multiple possible values; and
generating with the trained neural network a predicted sequence of characters based at least in part on the processing of the received image.

19. The non-transitory computer-readable medium of claim 18, wherein a softmax function is utilized to predict each random variable.

20. The non-transitory computer-readable medium of claim 18, wherein the received image is a street level image.

* * * * *